United States Patent
De Martini et al.

(10) Patent No.: US 8,412,967 B2
(45) Date of Patent: Apr. 2, 2013

(54) METHOD OF ENHANCING POWER SAVING IN AN INTEGRATED ELECTRONIC SYSTEM WITH DISTINCTLY POWERED ISLANDS OF FUNCTIONAL CIRCUITRIES AND RELATED DEVICE ARCHITECTURE

(75) Inventors: Chiara De Martini, Milan (IT); Matteo Giaconia, Monza (IT); Marco Provasi, Dairago (IT)

(73) Assignee: STMicroelectronics S.R.L., Argate Brianza (MB) (IT)

( * ) Notice: Subject to any disclaimer, the term of this patent is extended or adjusted under 35 U.S.C. 154(b) by 223 days.

(21) Appl. No.: 12/844,539

(22) Filed: Jul. 27, 2010

(65) Prior Publication Data
US 2011/0025383 A1 Feb. 3, 2011

(30) Foreign Application Priority Data
Jul. 28, 2009 (IT) .............................. VA2009A0053

(51) Int. Cl.
*G06F 1/32* (2006.01)
(52) U.S. Cl. .................... 713/320; 713/322; 713/324
(58) Field of Classification Search .......... 713/300–340, 713/500–501, 600–601
See application file for complete search history.

(56) References Cited

U.S. PATENT DOCUMENTS

| | | | |
|---|---|---|---|
| 5,550,489 A | 8/1996 | Raab | 326/93 |
| 7,000,140 B2 * | 2/2006 | Okubo et al. | 713/601 |
| 7,224,756 B2 * | 5/2007 | Subramoniam et al. | 375/345 |
| 7,386,749 B2 * | 6/2008 | Rifani et al. | 713/400 |
| 2003/0006807 A1 | 1/2003 | Masuda et al. | 327/99 |
| 2006/0218417 A1 * | 9/2006 | Sheng et al. | 713/300 |
| 2008/0104435 A1 * | 5/2008 | Pernia et al. | 713/322 |
| 2008/0189565 A1 * | 8/2008 | Sheng et al. | 713/300 |
| 2008/0282101 A1 | 11/2008 | Adams | 713/322 |
| 2010/0229011 A1 * | 9/2010 | Pedersen et al. | 713/322 |

* cited by examiner

*Primary Examiner* — Raymond Phan
(74) *Attorney, Agent, or Firm* — Allen, Dyer, Doppelt, Milbrath & Gilchrist, P.A.

(57) ABSTRACT

A method for power saving in an integrated circuit device may include defining an off-switchable analog circuit island including an internal clock generating circuit, and at power-on of the integrated circuit device, supplying to clocked digital circuits of the integrated circuit device an auxiliary clock from the external controller. The auxiliary clock has a frequency determined by the external controller and being lower than the root clock signal. The method includes supplying external reset commands to the integrated circuit device until an active functioning condition of the integrated circuit device is asserted, and interrupting the supply of the auxiliary clock and enabling supply of the root clock signal to the clocked digital circuits when the active functioning condition of the integrated circuit device is asserted.

16 Claims, 5 Drawing Sheets

METHOD OF ENHANCING POWER SAVING IN AN INTEGRATED ELECTRONIC SYSTEM WITH DISTINCTLY POWERED ISLANDS OF FUNCTIONAL CIRCUITRIES AND RELATED DEVICE ARCHITECTURE

FIELD OF THE DISCLOSURE

This disclosure relates to techniques for saving power in integrated electronic devices, and more particularly, to a method of enhancing power saving in an integrated electronic device including an off-switchable analog circuitry island.

BACKGROUND

A feature useful to many systems is the reduction or virtual elimination of power consumption when the device is not in use, is partially functioning, or is being prepared for a fast transition to any functioning condition. Apart from the full power down condition (system off), other reduced-power modes are often explicitly defined. The system configuration in these modes and the transitions between different functioning modes may make it necessary to devise and design specific circuitry to manage these conditions efficiently and reliably.

When the system clock is generated by the device under power control, a correct functioning of the device during transitions between two different power saving modes of the device and the resuming out of these modes should be ensured also when internal PLLs/DLLs have not yet locked to their reference signal. Techniques for reducing static power dissipation in monolithic electronics devices through the definition of power islands, as parts of the integrated systems submitted to distinct power domains (or islands of functional circuitries), is known in the art. See, e.g., [2], [3].

The distinct power domains may be independently supplied, thereby changing the supply values depending on the performance standards of the circuitry in the power island. A selective power-off of the different supply islands may also be contemplated and implemented, see, e.g., [3], for reducing static power consumption whenever circuits included in the power island are not in use.

The cited prior documents do not suggest how to manage the clock generated inside a monolithic device implementing a power saving mode, when the clock is also used outside the device and when specific requirements need to be satisfied, such as the correct generation of the clock during and after all transitions from the power saving modes to those modes in which the clock is used and propagated.

SUMMARY OF THE DISCLOSURE

A method of enhancing power saving in an integrated device, while properly managing the clock of the device when the clock generating circuit is switched off for saving power, is disclosed herein.

According to an embodiment, the clocked integrated circuits of the device are supplied with an auxiliary clock of reduced frequency at power-on of the device, and external asynchronous reset commands are supplied until a power-up condition is asserted. When a power-up condition is asserted, the auxiliary clock is not distributed anymore and the clocked digital circuitries are supplied with the main clock of the device.

According to another embodiment, the method may be implemented when the device has at least three circuit islands, two of which are off-switchable. In this embodiment, an off condition, a sleep condition, a stand-by condition and an active condition may be contemplated. A related integrated electronic system device adapted to implement the method is also disclosed.

DETAILED DESCRIPTION OF THE PREFERRED EMBODIMENTS

The method disclosed herein provides an efficient way of reducing power consumption in an integrated device in which the circuit dedicated to the generation of a system clock (or root clock) may be switched off for reducing power consumption. According to an embodiment, the correct management of the clock during and after all transitions from any power saving mode to the functioning modes in which the clock is used and propagated is ensured by supplying an auxiliary clock to clocked digital circuits of the integrated electronic system device of a frequency of orders of magnitude lower than that of the internally generated root clock. The auxiliary clock is provided by an external controller coupled to a digital interface circuit of the device. The external clock determines the power saving or the active functioning mode of the device.

Figure 1:
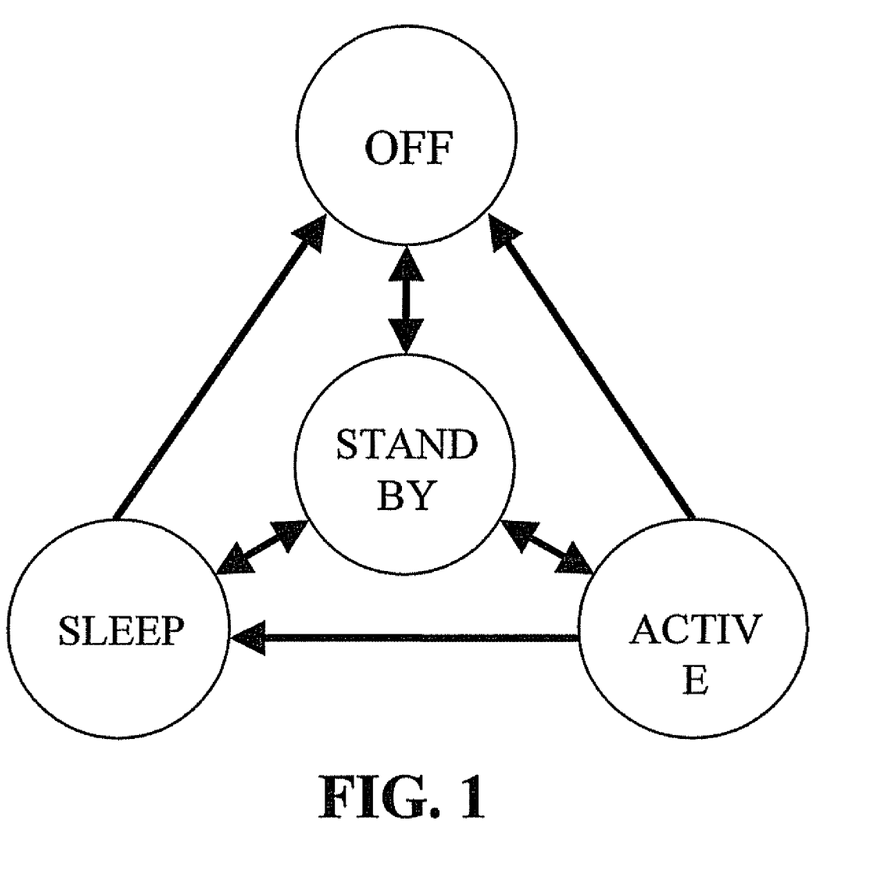
FIG. 1 is a diagram that illustrates the transitions between functioning conditions in an embodiment of a method, according to the present embodiments.

According to another embodiment of the method disclosed herein, the following states/modes of operation of the device are contemplated:
   off state (power consumption: none)
   standby mode (power consumption: lower than normal)
   active mode (power consumption: normal)
   sleep mode (power consumption: lowest when in a powered state);
and the allowed transitions between the various functioning modes are illustrated in FIG. 1:
   power up (OFF to STANDBY);
   entrance in sleep mode (STANDBY or ACTIVE to SLEEP);
   wake up (SLEEP to STANDBY);
   full activation (STANDBY to ACTIVE);
   short deactivation (ACTIVE to STANDBY);
   power off (any state to OFF).

As stated above, the disclosed device that implements the above particular embodiment of the method allows changes to the root clock frequency, in order to let clocked circuits work with a clock at a reduced frequency when the circuitry that generates the root clock is set in a power saving functioning state (stand-by or sleep).

Figure 2:
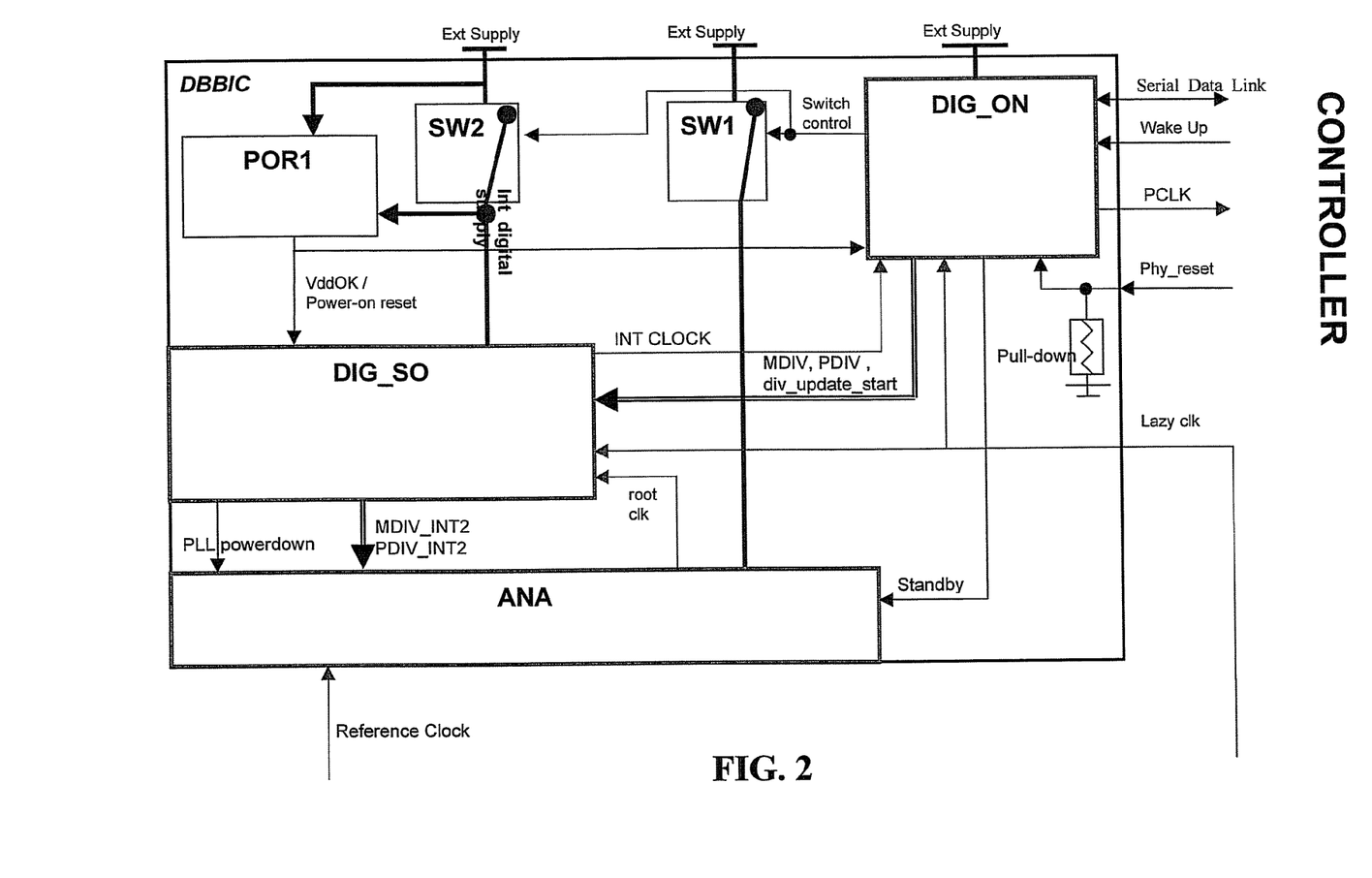
FIG. 2 is a block diagram of a device adapted to implement an embodiment of the method, including three distinct circuit islands, according to the present embodiments.
Figure 3:
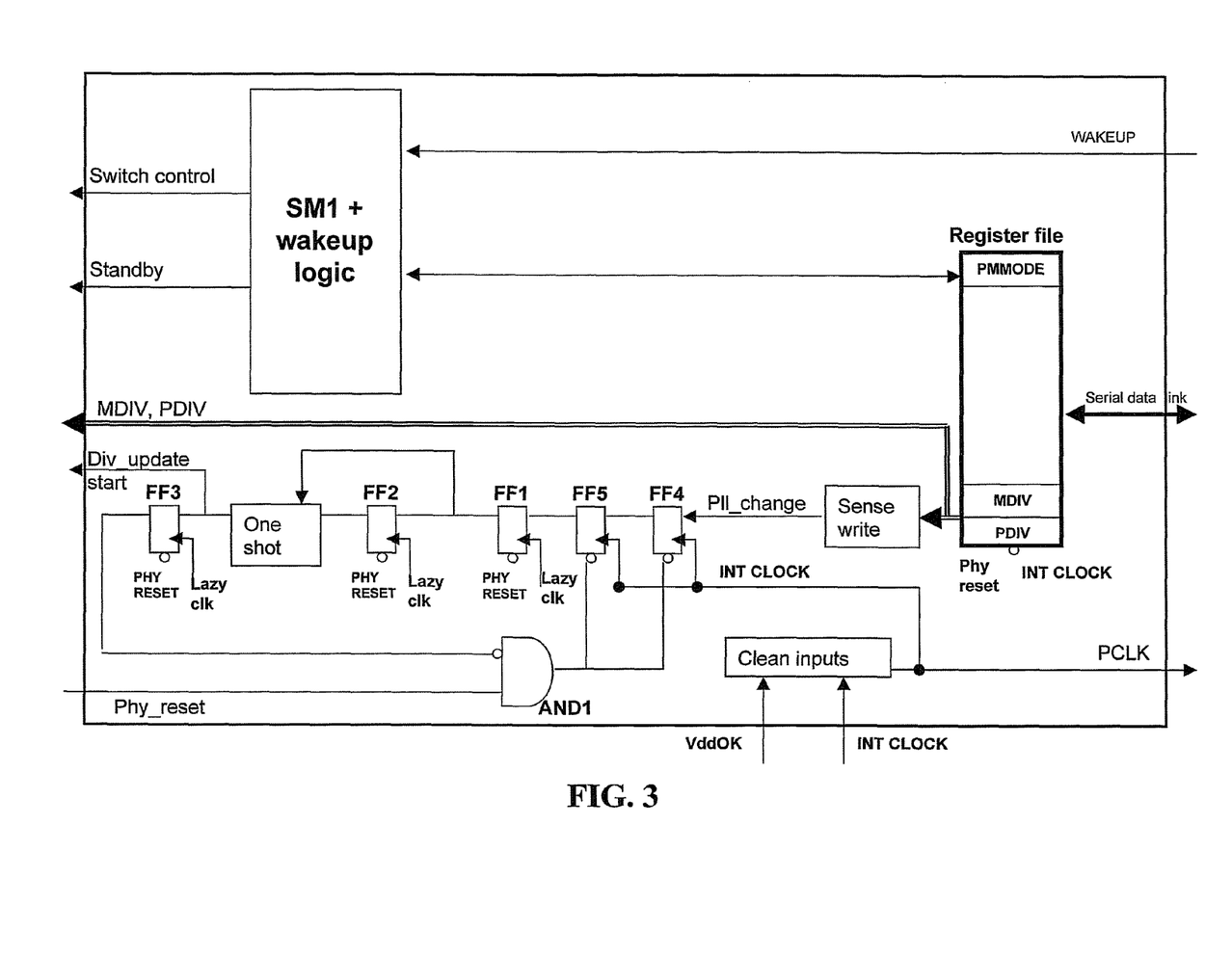
FIG. 3 is a block diagram of the circuit DIG_ON of FIG. 2.
Figure 5:
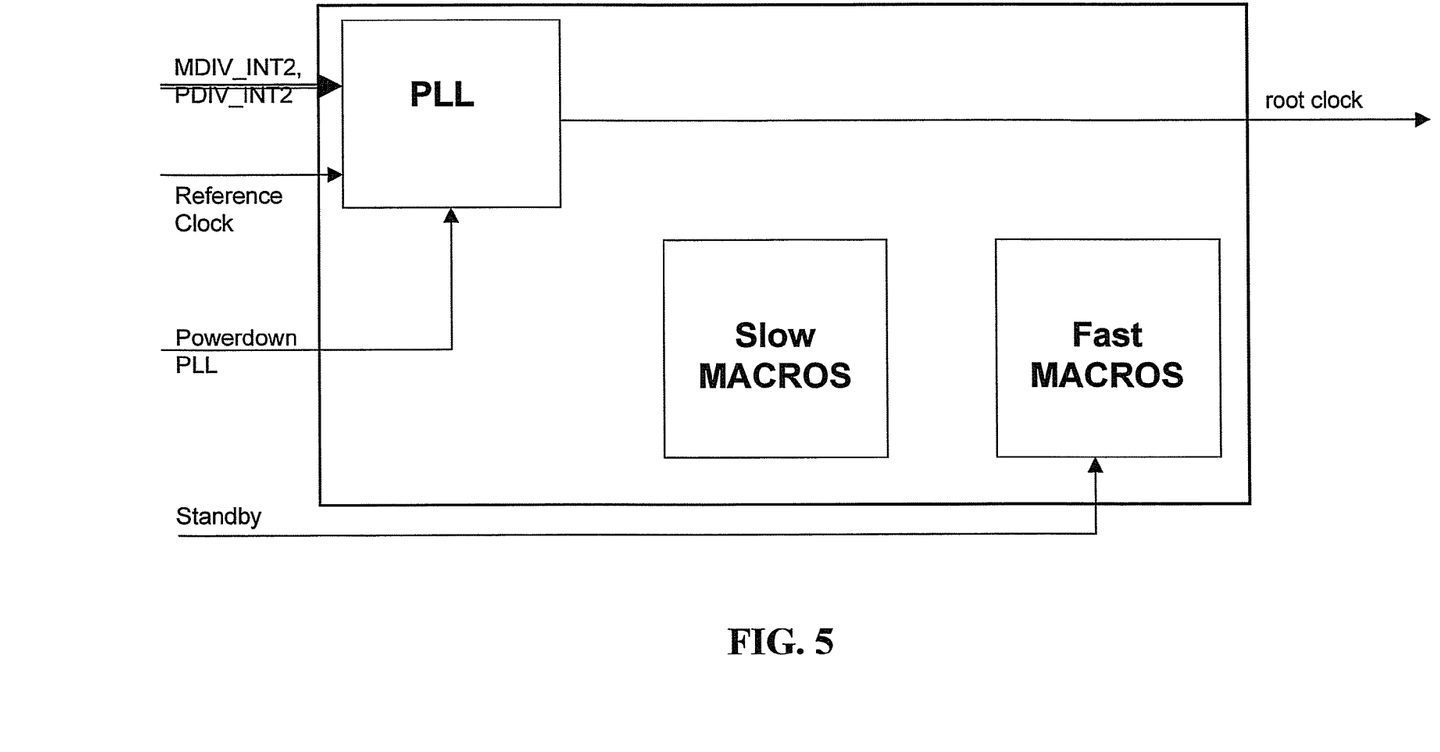
FIG. 5 is a block diagram of the circuit ANA of FIG. 2.

A functional block diagram of the device adapted to implement the method is illustrated in FIG. 2. It comprises three circuitry islands:
   always on digital section DIG_ON (FIG. 3) containing:
   the digital circuitry for device wake-up,
   a state machine SM1 tracing the power saving state of the device,
   the registers (register file R1) whose content has to be maintained even during the sleep mode, a one_shot generator FF1-FF2-oneshot comprising a reset generation circuitry FF3-AND1, a level generator adapted to flag the start of a frequency-switch operation FF4-FF5;

a digital off-switchable section DIG_SO (FIG. 4) containing all the digital circuitry that may be switched off when entering in sleep mode:

all the digital data paths, most of the control circuitry, in particular a counter Count used to enable the clock when this is stable after power up or after exiting sleep mode, an off-switchable analog section ANA (FIG. 5) containing:

all the analog circuitry, including the PLL that generates the root clock fed to the whole system device.

The meaning of the signals and circuit blocks illustrated in FIGS. 2 to 5 is summarized in the following table:

TABLE 1

| | |
|---|---|
| DBBIC | Integrated system device |
| Ext Supply | External supply voltage |
| DIG_ON | Always on circuit island |
| SW1 | Power Switch for ANA circuitry. |
| SW2 | Power Switch for DIG_SO circuitry. |
| POR1 | Power-on resetting circuitry |
| Wake Up | Command for carrying out the wake-up transition |
| Switch control | ON/OFF Switch command signal generated by the digital always on circuitry. |
| Int digital supply | Chip internal supply voltage, which may be either at ground value or at same value of external supply voltage, depending on whether switches are ON or OFF. |
| INT CLOCK | Clock generated and used internally and also meant to be output by the system on PCLK output. |
| VddOK/Power-on reset | Power-on reset generated by the voltage detection circuitry POR1. |
| Phy_reset | Reset signal |
| Pull-down | Circuit for grounding the Phy_reset signal |
| DIG_SO | Off switchable digital circuit |
| MDIV/PDIV | Loop divider values that allow control of the frequency of the PLL's output clock. PLL is located in ANA section. Generated by always-on circuitry (never lost unless explicitly reset). |
| Lazy clk | Auxiliary clock signal |
| root_clk | Main clock signal |
| PLL powerdown | Signal that allows powering down of the PLL. This power-down condition may be necessary for some types of PLL before any frequency change. |
| MDIV_INT2/PDIV_INT2 | Same as MDIV/PDIV, but cleared at any power on reset and synchronous to auxiliary clock domain. It is the copy of loop dividers that is actually forwarded to PLL. |
| ANA | Off switchable analog circuit comprising the circuit for generating the main clock signal root_clk |

TABLE 1-continued

| | |
|---|---|
| Standby | Command for setting the device in a stand-by state |
| Reference Clock | Input reference clock for PLL, for generation of all Internal clocks and of clk_ out |
| SM1 + wakeup logic | State machine (SM1) adapted to trace a plurality of power saving states + a logic circuitry for carrying out the wake-up transition |
| Register file | Bank of registers used that contain device configuration information. |
| Serial data link | Interface for configuration-data exchange between device and external world. |
| PCLK | Clock generated by PLL and used both internally and externally. |
| Div_update start | Signal synchronous to auxiliary clock domain that requests internal activation of the PLL's loop dividers update procedure. |
| One shot | Circuitry that generates a 1 clock-cycle wide pulse signal from a level signal. |
| Clean inputs | Isolation logic: avoids propagation of inputs coming from switchable regions until their voltage level is acceptable. |
| Sense write | Circuitry that detects a modification of program values of loop dividers for PLL. |
| PMMODE | Configuration register accessible through serial data link which contains the setting of the desired power management mode of operation. |
| COUNT | Counter |
| GAT1 | Clock gating cell |
| enable | Signal that enables propagation of new values of loop dividers towards PLL only after the appropriate (PLL-dependent) timings have been met. |
| Clock dividers | Logic for generation of all needed internal frequencies, starting from the PLL's generated frequency. |
| All clocks | Various clocks generated by division starting from the PLL's output and being fed to internal components depending on their functionality. |
| LOGIC CIRCUITRY | Logic circuits contained in the block DIG _SO. |
| PLL | Phase-locked-loop for clock generation. |
| Slow MACROS | Analog macros which feature a long wakeup/settling time |
| Fast MACROS | Analog macros, which feature a short wakeup/settling time, and thus, may be powered off even in STANDBY mode. |

Two main switches SW1 and SW2 are used to switch on and off the power supply for the ANA and DIG_SO circuit islands, respectively. In an embodiment, SW1 and SW2 are typically a set of several switches distributed among all the power supply inputs related to these zones. A power-on reset generator (POR1) keeps the core logic under reset until the power supply voltage at the output of the switches has reached the desired level. Provided that an appropriate HDL (Hardware Description Language) description is given by hierarchically separating the different voltage areas, the differentiation between zones may be accomplished using an automatic place and route tool, through the standard procedures normally employed to manage multiple power supplies. The three separated islands are to be used in conjunction with specific procedures driven by software from any control circuit able to translate a user command or a software procedure into hardware physical signals.

A detailed description of each functioning condition contemplated in the embodiment illustrated in FIG. 1 is given hereinbelow.

OFF STATE: In this state the whole device is off.

STANDBY MODE: Standby mode is a mild power-saving functioning mode. The ANA zone in this state is selectively powered down: the PLL and the macros with slow settling time (slow MACROS in FIG. 5) are on, the remaining sections are off. As far as the digital zone DIG_SO is concerned, the clock may be selectively gated off in the parts that are not active. This reduces the dynamic power dissipated in DIG_SO virtually to zero. When the device is in this functioning mode, its activities are limited to the programming of the device through the register file and the change of the clock frequency.

ACTIVE MODE: In active mode, the device is fully powered and functional. Typical power saving techniques (clock gating, mixed-threshold library usage, operand isolation etc.) are put in place to limit power consumption. Additionally, a clock gating mechanism is employed at the macro-module level, to selectively gate clock propagation to sections of the digital switch-off area when they are unused.

SLEEP MODE: Sleep mode is a heavy power-saving functioning mode. The switches SW1 and SW2 are both open, thus the whole analog section ANA and the DIG_SO digital section are powered off. No clock is propagated to the core logic or to PCLK output and all inputs to the digital always-on section DIG_ON coming from any of the switchable sections are gated. In this state, no actions may be accomplished by the system, except waking up to go back to standby mode.

The transitions between the above functioning conditions contemplated in the above particular embodiment of the method illustrated in FIG. 1 are:

Power Up (Off to Standby)

Power up is the transition from OFF state to standby mode. In order to allow for this transition to work properly, the device may be exercised coherently with the following procedure:

An auxiliary clock Lazy_clk may be present and driven by the external controller at a predefined frequency at power up. A pull-down (FIG. 2) ensures that the external asynchronous reset Phy_reset, is driven to logic zero during power up. As an alternative, an external driver may drive this signal to logic zero during power up.

Figure 4:
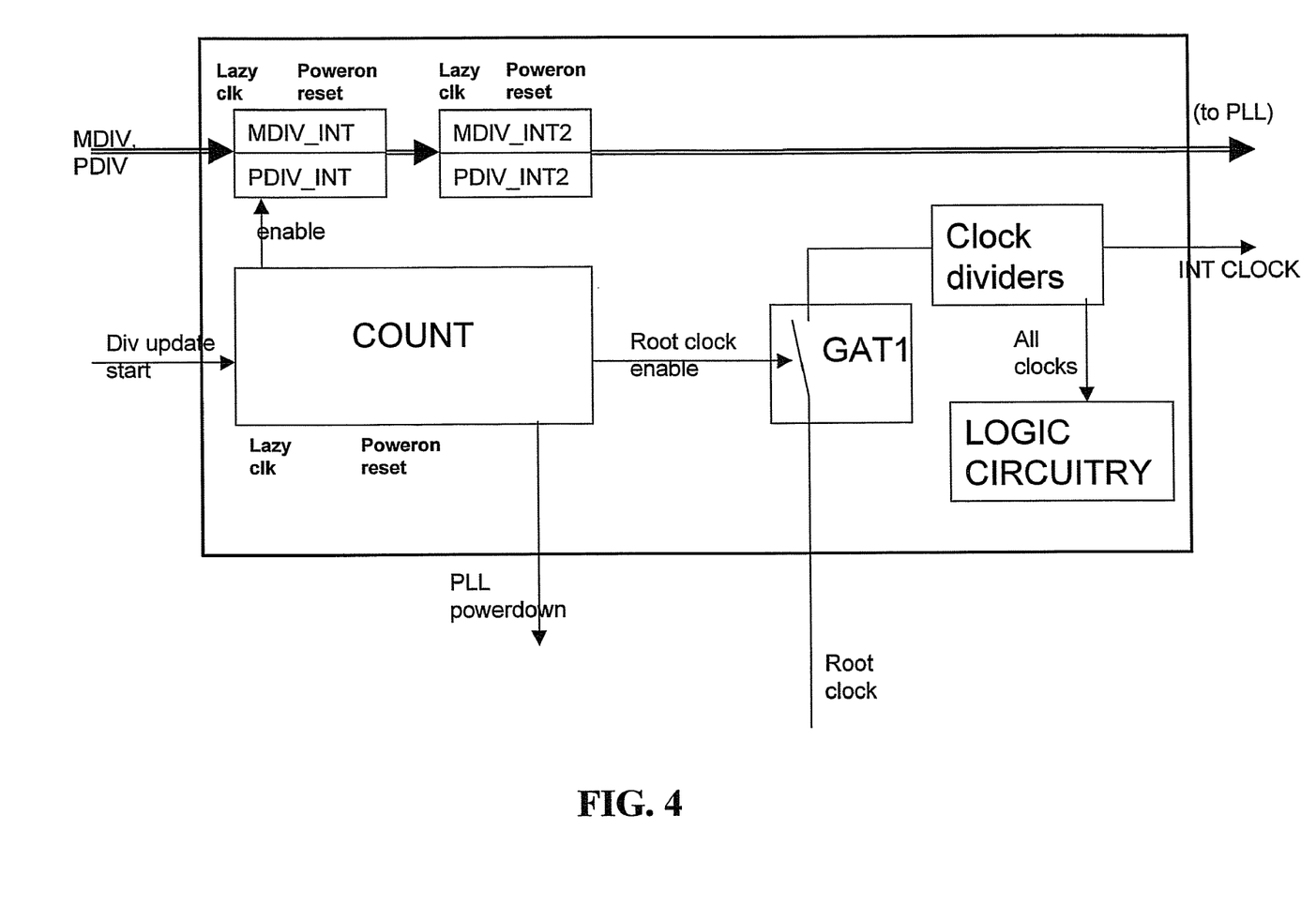
FIG. 4 is a block diagram of the circuit DIG_SO of FIG. 2.

The power-on reset POR1 ensures the reset of the sensitive circuitry, which are the registers setting the values for the loop divider of the PLL, and the auxiliary clock counter (COUNT in FIG. 4). These registers exit from power-on reset with the default value related to a typical circuital condition. The PHY_ACTIVE signal output goes to a high logic value. This indicates to the external controller that the device is powered on and is completing the power up procedure. The PLL is tracking its input reference to lock at the default conditions and the counter COUNT is running on Lazy_clk.

After a fixed number of Lazy_clk cycles, the PLL is guaranteed to have locked. Until counter COUNT reaches a first threshold (defined including time necessary for the PLL reference to be stable), the PLL powerdown signal is kept in an asserted state. Counter COUNT then counts for an additional time to allow the PLL to lock, then it closes the gating cell GAT1 (FIG. 4) and the root clock is available to the device.

A soon as the external controller receives PCLK (which is derived from the root clock), it de-asserts PHY_RST. As soon as PHY_RST input is de-asserted, the PHY_ACTIVE output switches low. This indicates to the external controller that the power up procedure has been completed. The internal state machine SM1 goes from reset state to standby mode. An externally-accessible status register (PMMODE in FIG. 3) is set to an appropriate value to allow the external controller to verify the current status. Access to the register file is done through a protocol synchronous with PCLK.

Entrance in Sleep Mode (Active or Standby to Sleep)

When the device is not busy with functions asked by the external controller, a register belonging to the register file R1 (PMMODE in FIG. 3) may be accessed to place the device in sleep mode according to the following procedure: when the PMMODE register is set to sleep value by the external controller, and the PHY_RST signal maintained de-asserted, the Status signal brings the state machine SM1 to the sleep state. The state machine SM1 opens the switches SW1 and SW2 (which powers down sections ANA and DIG_SO). The always on digital section DIG_ON is still powered on, thus the wake-up signal may be sensed and the information in the register file section is preserved.

Wakeup (Sleep to Standby)

Transition out of sleep state takes place according to the following procedure: since the clock generator is switched off when in sleep mode, the external controller needs to send an asynchronous signal in order to wake up the device. A possible asynchronous wake-up signal can be the simultaneous assertion of two signals, which are one-hot in all conditions other than sleep. Any other ad hoc asynchronous signal (wakeup in FIG. 2 and FIG. 3) could accomplish the same function. The asynchronous wake-up acts directly on combinational logic belonging to the controller SM1. This closes the switches SW1 and SW2; as in the power up sequence, power on reset initializes and restarts the counter COUNT, which closes the gating cell GAT1 when the PLL has locked. PHY_ACTIVE is toggled accordingly to [1] par. 11.1.2; when the external controller senses PHY_ACTIVE high in the presence of PCLK, indicating that the device has completed wakeup procedures, it may de-assert the wake-up signals (TX_EN and RX_EN).

Full Activation (Standby to Active)

When the controller wishes to make full usage of device functionalities, a transition to active state is triggered by writing the "active" value into the register PMMODE. During this transition, the fast settling analog macros belonging to section ANA may be selectively turned back on by using a signal the value of which depends on the requested activity (reception or transmission). Given the nature of the macros, no specific care need to be taken for timings. Clock is propagated to all necessary digital logic.

Short Deactivation (Active to Standby)

When mild power saving is desired and only device programming is needed, for instance during short periods of inactivity, the external controller may trigger a transition to standby state by writing the "standby" value into register PMMODE. During this transition, the fast settling analog macros belonging to section ANA may be turned off. No specific care needs to be taken for timings. PCLK is present, while most internal clocks are gated off.

Power Off (any Mode to Off)

This is a trivial transition: all external power supplies are switched off and no specific action needs to be taken inside the device.

To change the device operating clock frequency, the external controller may access the MDIV and PDIV registers belonging to the register file R1. This may happen in standby mode only. The clock frequency switch takes place according to the following procedure: the PLL change signal is generated by the sensor SENS-FF4-FF5 (FIG. 3), clocked by PCLK, and sent to the one_shot signal generator, clocked by the auxiliary clock Lazy_clk, which generates a one auxiliary-cycle wide signal div_update_start and the reset for SENS-FF4-FF5.

The div_update_start pulse resets the counter COUNT (FIG. 4). Consequently, the clock gating cell GAT1 is opened since the frequency is about to be changed and the PLL loop is put in a power down condition (only safe condition to change loop divider). The registers MDIV_INT, MDIV_INT2, PDIV_INT, PDIV_INT2 are delaying the propagation of the new loop dividers to the PLL, to guarantee that this happens only after GAT1 has opened and PLL loop is powered down. When counter COUNT reaches its frequency-switch threshold (defined including time necessary for the PLL to lock), gating cell GAT1 is closed and the root clock becomes available to the device. Note that this threshold is lower with respect to the one used for power up (only PLL locking time needs to be taken into account as clock reference is already stable).

According to another embodiment, the registers in the register file may be realized using master-slave registers with the master part maintaining the information and a slave part interfacing the rest of the device (write circuitries, read drivers) putting the slave part in the DIG_SO zone (slave), and the master part in the DIG_ON zone (master).

In another embodiment, the register file may be put into the DIG_SO zone, and the content may be flushed out from the registers into a non-volatile memory and then reloaded in the register file after the power up or after exiting the sleep mode.

That which is claimed is:

1. A method of power saving in an integrated circuit device including an analog circuit receiving an external reference frequency signal, and at least one internal clock generating circuit configured to receive a root clock signal from the analog circuit, the integrated circuit device comprising differently powered islands of functional circuits commanded by an external controller, the method comprising:
    defining an off-switchable analog circuit island including the at least one internal clock generating circuit;
    at power-on of the integrated circuit device, supplying to clocked digital circuits of the integrated circuit device an auxiliary clock signal from the external controller, the auxiliary clock signal having a frequency of orders of magnitude lower than the root clock signal, and supplying external asynchronous reset commands to the integrated circuit device until reaching an active functioning condition of the integrated circuit device; and
    interrupting the supply of the auxiliary clock signal and enabling supply of the root clock signal to the clocked digital circuits when the active functioning condition of the integrated circuit device is reached.

2. The method of claim 1 further comprising defining at least two more separate supply voltage islands including:
    a first digital circuit island including an interface and wake-up logic circuit, a state machine configured to trace a plurality of power saving states of the integrated circuit device, and at least one system register having content being retained through sleep functioning condition intervals; and
    a second off-switchable digital circuit island including digital circuits that can be switched off when the integrated circuit device enters a sleep mode.

3. The method of claim 2 further comprising supplying the auxiliary clock signal and the external asynchronous reset commands to the clocked digital circuits of the first digital circuit island and to the second off-switchable digital circuit island.

4. The method of claim 2 further comprising defining a plurality of different functioning conditions for the integrated circuit device including:
    an off condition where all systems of the integrated circuit device are off;
    a stand-by condition where the off-switchable analog circuit island is partially off, and where the second off-switchable digital circuit island is in an on state;
    a sleep condition where the off-switchable analog circuit island and the second off-switchable digital circuit island are off; and
    an active condition where the first digital circuit island, the second off-switchable digital circuit island, and the off-switchable analog circuit island are on.

5. The method of claim 2 wherein the first digital circuit island is always on.

6. The method of claim 4 further comprising performing transitions between the plurality of different functioning conditions, the transitions including:
    a power-up transition from the off condition to the stand-by condition;
    a sleep transition from at least one of the active condition and the stand-by condition to the sleep condition;
    a wake-up transition from the sleep condition to the stand-by condition;
    a full activation transition from the stand-by condition to the active condition;
    a short deactivation transition from the active condition to the stand-by condition; and
    a power off transition from at least one of the stand-by condition, the sleep condition, and the active condition to the off condition.

7. A method of power saving in an integrated circuit device including an analog circuit receiving an external reference frequency signal, and at least one internal clock generating circuit configured to receive a root clock signal from the analog circuit, the integrated circuit device comprising differently powered islands of functional circuits commanded by an external controller, the method comprising:
    defining an off-switchable analog circuit island including the at least one internal clock generating circuit;
    at power-on of the integrated circuit device, supplying to clocked digital circuits of the integrated circuit device an auxiliary clock signal from the external controller, the auxiliary clock signal having a frequency lower than the root clock signal;
    supplying external reset commands to the integrated circuit device until reaching an active functioning condition of the integrated circuit device; and
    interrupting the auxiliary clock signal and enabling supply of the root clock signal to the clocked digital circuits when the active functioning condition of the integrated circuit device is reached.

8. The method of claim 7 further comprising defining at least two more separate supply voltage islands including:
    a first digital circuit island including an interface and wake-up logic circuit, a state machine configured to trace a plurality of power saving states of the integrated circuit device, and at least one system register having content being retained through sleep functioning condition intervals; and a second off-switchable digital circuit island including digital circuits that can be switched off when the integrated circuit device enters a sleep mode.

9. The method of claim 8 wherein the first digital circuit island is always on.

10. The method of claim 8 further comprising supplying the auxiliary clock signal and the external reset commands to the clocked digital circuits of the first digital circuit island and to the second off-switchable digital circuit island.

11. The method of claim 8 further comprising defining a plurality of different functioning conditions for the integrated circuit device including:

an off condition where all systems of the integrated circuit device are off;

a stand-by condition where the off-switchable analog circuit island is partially off, and where the second off-switchable digital circuit island is in an on state;

a sleep condition where the off-switchable analog circuit island and the second off-switchable digital circuit island are off; and an active condition where the first digital circuit island, the second off-switchable digital circuit island, and the off-switchable analog circuit island are on.

12. The method of claim 11 further comprising performing transitions between the plurality of different functioning conditions, the transitions including:

a power-up transition from the off condition to the stand-by condition;

a sleep transition from at least one of the active condition and the stand-by condition to the sleep condition;

a wake-up transition from the sleep condition to the stand-by condition;

a full activation transition from the stand-by condition to the active condition;

a short deactivation transition from the active condition to the stand-by condition; and a power off transition from at least one of the stand-by condition, the sleep condition, and the active condition to the off condition.

13. An integrated circuit device configured to communicate with an external controller generating an auxiliary clock signal and external asynchronous reset commands, the integrated circuit device comprising:

an analog circuit configured to receive an external reference frequency signal;

at least one internal clock generating circuit configured to receive a root clock signal from said analog circuit;

a digital interface circuit; and differently powered islands of functional circuits configured to be commanded by the external controller coupled to said digital interface circuit;

said differently powered islands including a first digital circuit island including an interface and wake-up logic circuit, a state machine configured to trace a plurality of power saving states, and at least one system register configured to have content be retained through sleep functioning condition intervals, a second off-switchable digital circuit island including digital circuits that can be switched off when the integrated circuit device enters a sleep mode, and a third off-switchable analog circuit island, the auxiliary clock signal and the external asynchronous reset commands being supplied to the clocked digital circuits of the first digital circuit island and of the second off-switchable digital circuit island.

14. The integrated circuit device of claim 13 wherein the integrated circuit device is configured to operate in a plurality of different functioning conditions including:

an off condition where all systems of the integrated circuit device are off;

a stand-by condition where the third off-switchable analog circuit island is partially off, and where the second off-switchable digital circuit island is in an on state;

a sleep condition where the third off-switchable analog circuit island and the second off-switchable digital circuit island are off; and an active condition where the first digital circuit island, the second off-switchable digital circuit island, and the third off-switchable analog circuit island are on.

15. The integrated circuit device of claim 13 wherein said first digital circuit island is always on.

16. The integrated circuit device of claim 14 wherein the integrated circuit device is configured to perform transitions between the plurality of different functioning conditions, the transitions including:

a power-up transition from the off condition to the stand-by condition;

a sleep transition from at least one of the active condition and the stand-by condition to the sleep condition;

a wake-up transition from the sleep condition to the stand-by condition;

a full activation transition from the stand-by condition to the active condition;

a short deactivation transition from the active condition to the stand-by condition; and a power off transition from at least one of the stand-by condition, the sleep condition, and the active condition to the off condition.

* * * * *